United States Patent
Martinez (10) Patent No.: US 9,350,586 B2
(45) Date of Patent: May 24, 2016

(54) DEVICE FOR RECEIVING INTERLEAVED COMMUNICATION SIGNALS

(71) Applicant: Vincent Pierre Martinez, Castres (FR)

(72) Inventor: Vincent Pierre Martinez, Castres (FR)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 0 days.

(21) Appl. No.: 14/467,323

(22) Filed: Aug. 25, 2014

(65) Prior Publication Data

US 2015/0270997 A1  Sep. 24, 2015

(30) Foreign Application Priority Data

Mar. 24, 2014 (WO) .................. PCT/IB2014/000800

(51) Int. Cl.
*H03D 1/00* (2006.01)
*H04L 27/26* (2006.01)
*H04L 5/00* (2006.01)

(52) U.S. Cl.
CPC ............ *H04L 27/265* (2013.01); *H04L 5/0005* (2013.01); *H04L 27/2662* (2013.01)

(58) Field of Classification Search
CPC .................................................... H04L 25/022
USPC .......................................................... 375/343
See application file for complete search history.

(56) References Cited

U.S. PATENT DOCUMENTS

| 4,214,125 | A  | * | 7/1980 | Mozer et al. ................ 704/268 |
| 2009/0068956 | A1 | * | 3/2009 | Naito et al. ................ 455/67.11 |
| 2010/0124194 | A1 | * | 5/2010 | Chun et al. .................. 370/329 |
| 2012/0182857 | A1 |   | 7/2012 | Bertrand et al. |

OTHER PUBLICATIONS

Freescale Semiconductor, Inc., "QorIQ Qonverge B4860 Baseband Processor," Fact Sheet B4860; downloaded from <<http://www.freescale.com/webapp/sps/site/prod_summary.jsp?code=B4860>>on Jul. 18, 2014; 2 pages.
Freescale Semiconductor, Inc., "Next-Generation Wireless Network Bandwidth and Capacity Enabled by Heterogeneous and Distributed Networks," White Paper, QorIQ Qonverge Portfolio, Document No. QORIQQONVERGEWP; Rev. 2; Sep. 2012, 19 pages.

* cited by examiner

*Primary Examiner* — Lihong Yu (57) ABSTRACT

A signal decoder in a communication system is for decoding signal elements in a communication signal having interleaved carrier frequencies. The decoder receives antenna signals in a frequency domain, and has a multiplier for multiplying the antenna signals by a complex-valued mathematical sequence such as the Zadoff-Chu sequence, to generate multiplied antenna signals. An inverse frequency to time converter converts the multiplied antenna signals to time domain signals. A signal quality detector detects a signal quality from the time domain signals based on a subset of the carrier frequencies. The complex-valued mathematical sequence is provided with zero values corresponding to carrier frequencies that are not included in the subset, and the inverse frequency to time converter has a transform size corresponding to the multiplied antenna signals including all carrier frequencies.

17 Claims, 10 Drawing Sheets

DEVICE FOR RECEIVING INTERLEAVED COMMUNICATION SIGNALS

CROSS REFERENCE TO RELATED APPLICATION(S)

The present application claims priority to International Patent Application No. PCT/IB2014/000800, entitled "DEVICE FOR RECEIVING INTERLEAVED COMMUNICATION SIGNALS," filed on Mar. 24, 2014, the entirety of which is herein incorporated by reference.

FIELD OF THE INVENTION

This invention relates to a signal decoder for decoding signal elements in a communication signal in a communication system. The invention further relates to a receiver, an integrated circuit, a base station, a method of decoding signal elements in a communication signal in a communication system and a computer program product.

BACKGROUND OF THE INVENTION

An overview of communication systems can be found in the white paper "Next-Generation Wireless Network Bandwidth and Capacity Enabled by Heterogeneous and Distributed Networks" by Freescale, which company also provides processors for such systems such as B4860 "QorIQ Qonverge B4860 Baseband Processor". This processor targets macro cell base station designs for broadband wireless infrastructure and has four 64 bit, dual-threaded processor cores, six 16 bit 32GMAC/cycle calculation cores and baseband acceleration processing engines. It is designed to adapt to the rapidly changing and expanding standards of LTE (FDD and TDD), LTE-Advanced and WCDMA and supports different standards simultaneously. Technical data for the B4860 processor is available via http://www.freescale.com/webapp/sps/site/prod_summary.jsp?code=B4860.

As such, data processing of received communication signals in the base station is well known. An example of a communication system is a fourth generation (4G) cell based mobile communication system such as LTE system (Long Term Evolution, which is the most recent step forward from cellular 3G services) or the Wideband Code Division Multiple Access (W-CDMA) system.

In cell based mobile communication systems base stations are provided to communicate with the mobile devices. Such base stations usually have a layered structure. The basic data flow of an LTE base station will be described now.

Figure 1:
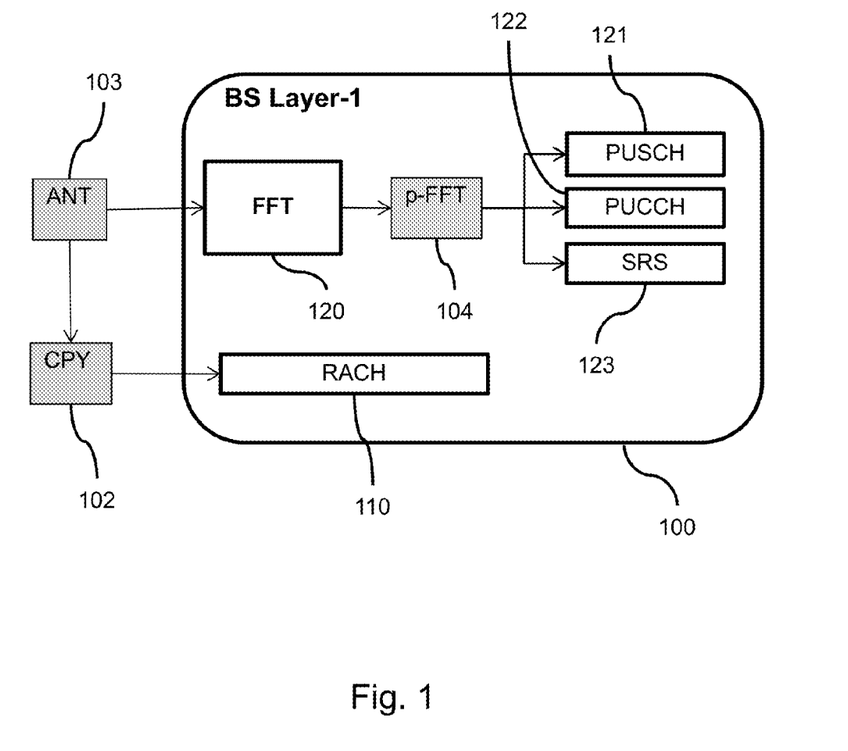
FIG. 1 shows a block diagram of an example of a receiver for a communication signal in an LTE communication system.

FIG. 1 shows an example of a receiver for a communication signal in an LTE communication system. The Figure exemplifies a data flow in a base station on a signal layer, indicated as base station layer one BS Layer-1. The Figure shows a receiver 100 coupled to antenna data ANT 103 on a first input and a copy CPY 102 of the antenna data on a second input. In the Figures interfaces for transferring data are depicted by a gray background. The second input is coupled to a RACH unit for decoding the random access channel, which Random Access Channel (RACH) is used for initial access and when the User Equipment (UE) losses its uplink synchronization. The first input is coupled to a FFT unit 120 arranged for applying a Fast Fourier Transform (FFT) on the antenna data to provide post FFT data p-FFT 104. The post FFT data is coupled to a PUSCH decoder 121 for decoding the Physical Uplink Shared Channel (PUSCH), which carries the Layer-1 Uplink (UL) transport data together with control information. Supported modulation formats on the PUSCH are QPSK, 16QAM and depending on the user equipment category 64QAM. PUSCH is a channel, which uses SC-FDMA. The post FFT data is also coupled to a PUCCH decoder 122 for decoding the Physical Uplink Control Channel (PUCCH), which carries control information. Note that the Uplink control information comprises Downlink (DL) acknowledges as well as quality related reports. Finally, the post FFT data is also coupled to a SRS decoder 123 for decoding the sounding reference signals (SRS) used to estimate the uplink channel conditions in frequency division duplexing (FDD), and the uplink and downlink channels in time-division duplexing (TDD; since in TDD, uplink and downlink share the same spectrum) for each user to decide the best uplink scheduling.

SRS is a channel of the LTE standard and is a signal sent by the UE to the base station for channel quality measurements. Typical metrics are SNR (Signal-to-Noise Ratio) or SINR (Signal-to-Interference-plus-Noise Ratio) per resource block. SRS is defined in 3GPP specifications for Evolved Universal Terrestrial Radio Access (E-UTRA); Physical channels and modulation, Multiplexing and channel coding, and Physical layer procedures. Hence SRS is one of the LTE channels that need to be decoded by the base station. This processing requires several steps, large interface buffers in between each step, and frequent interaction between an FFT accelerator and a DSP Core. The current document further focuses on signal processing in the SRS decoder in the LTE base station, although such processing may also be applied in other decoders for decoding reference signals or other signal parts in a communication signal that use interleaved carrier frequencies.

Figure 2:
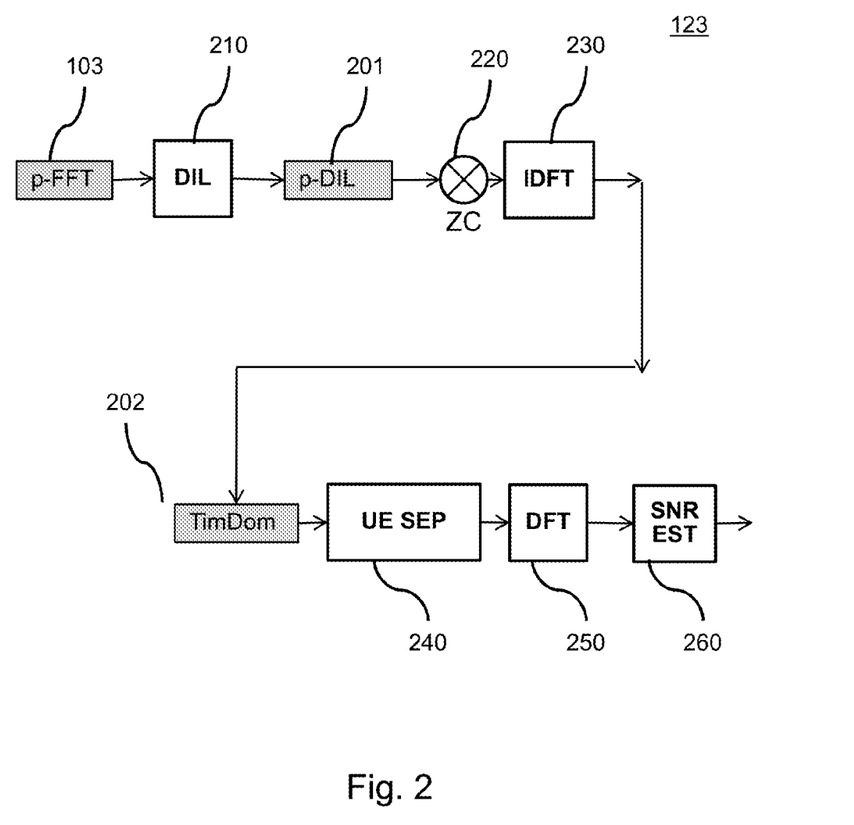
FIG. 2 shows an example of an SRS decoder, FIG. 3 schematically shows an example of an embodiment of an SRS decoder.

FIG. 2 shows an example of an SRS decoder. The classic structure receives the post FFT data p-FFT 103 on the input of a de-interleaver DIL 210 to generate de-interleaved data p-DIL 201. The de-interleaving, usually called comb de-interleaving or DIL, is performed in the frequency domain on the respective part of a communication signal using multiple groups of interleaved carrier frequencies, e.g. SRS. A respective group of carrier frequencies is assigned to a specific communication channel, e.g. to a specific portable user device. An SRS comb refers to such a group of subcarriers, and may be called comb function or comb in this document. In LTE-SRS there are 2 combs which are interleaved (one subcarrier after another). Generally in LTE the 2 combs are assigned the even and odd subcarriers indexes, respectively.

Subsequently the de-interleaved data p-DIL is multiplied by the Zadoff-Chu sequence in ZC unit 220. The Zadoff-Chu sequence is a complex-valued mathematical sequence which, when applied to radio signals, gives rise to an electromagnetic signal of constant amplitude, whereby cyclically shifted versions of the sequence imposed on a signal result in zero correlation with one another at the receiver. Zadoff-Chu sequences are used in the 3GPP LTE Long Term Evolution air interface in the Primary Synchronization Signal (PSS), random access preamble (PRACH), uplink control channel (PUCCH), uplink traffic channel (PUSCH) and sounding reference signals (SRS). By assigning orthogonal Zadoff-Chu sequences to each LTE channel and multiplying their transmissions by their respective codes, the cross-correlation of simultaneous channel transmissions is reduced, thus reducing inter-cell interference and uniquely identifying channel transmissions.

The output of the ZC unit is processed by IDFT unit 230 to apply an inverse Discrete Fourier Transform, which provides an output of time domain signals TimDom 202 by conversion from frequency domain signals to time domain signals. The time domain signals may represent time domain channel taps, and are subsequently separated for a respective UE by UE- SEP unit 240. The separated time domain values from the UE-SEP unit are coupled to a discrete Fourier Transform unit DFT 250 to provide a frequency domain signal coupled to a noise estimator SNR-EST 260, which determines the signal to noise ratio for the respective UE based on the group of subcarriers assigned to that UE in the SRS signal so as to output the required SRS output for further use in the LTE base station, well known as such.

United States patent application US2012/0182857 provides an example of Sounding Reference Signal processing for LTE, and further elucidates the known processing elements, such as FFT, IDFT and ZC processing. A wireless communication receiver includes a serial to parallel converter receiving an radio frequency signal, a fast Fourier transform device connected to said serial to parallel converter converting $N_{FFT}$ corresponding serial signals into a frequency domain; a ZC root sequence unit generating a set of root sequence signals; an element-by-element multiply unit forming a set of products including a product of each of said frequency domain signals from said fast Fourier transform device and a corresponding root sequence signal, an $N_{SRS}$-length IDFT unit performing a group cyclic-shift de-multiplexing of the products and a discrete Fourier transform unit converting connected cyclic shift de-multiplexing signals back to frequency-domain.

In practice, the process called "comb de-interleaving" (DIL) may be implemented by a DSP using multiple processing cycles, as well as requiring an intermediate interface to a memory to save temporary data. Such processing, memory and interface require processing circuitry and supply power.

SUMMARY OF THE INVENTION

The present invention provides a signal decoder, a receiver, an integrated circuit, a base station, a method of decoding signal and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In the following, for sake of understanding, the circuitry may be described in operation. However, it will be apparent that the respective elements are arranged to perform the functions being described as performed by them.

Figure 3:
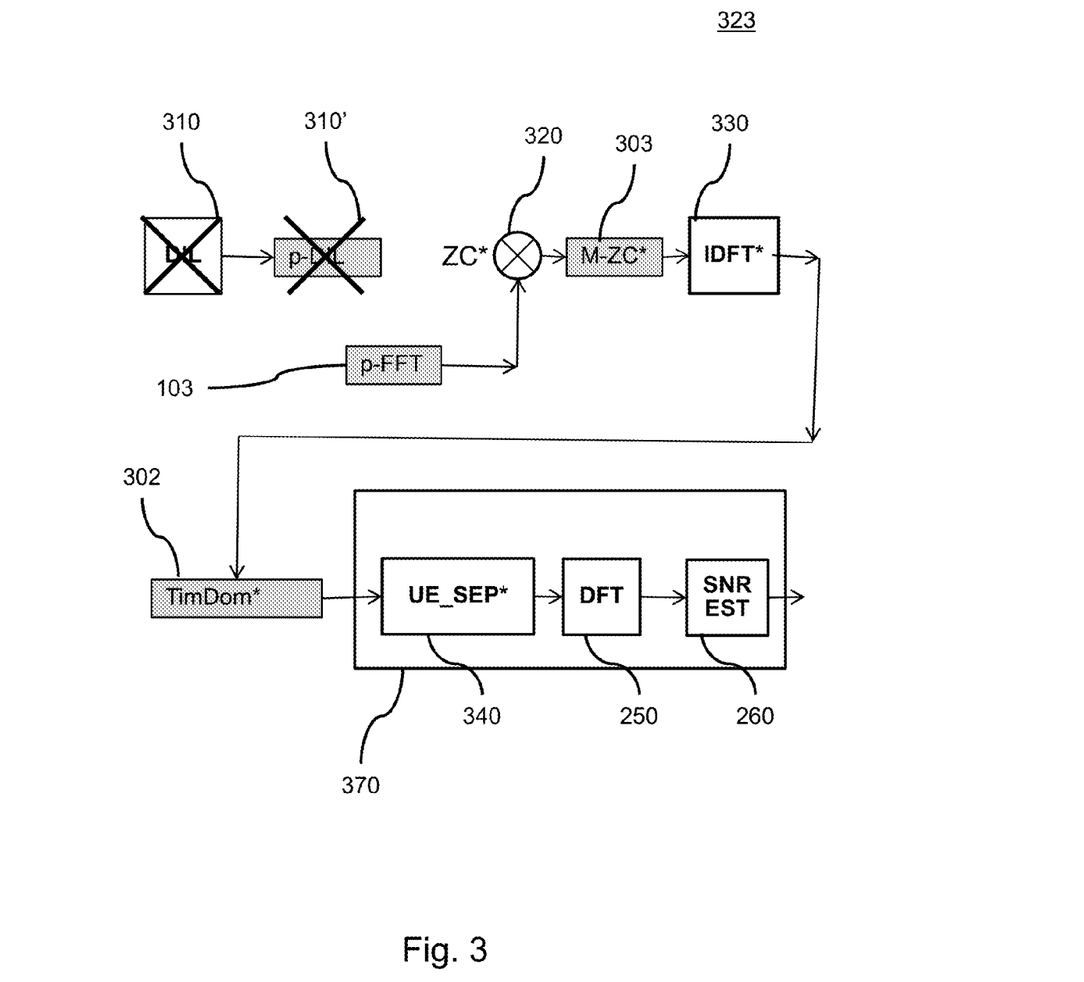

FIG. 3 schematically shows an example of an embodiment of a signal decoder. Various elements correspond to the classic SRS decoder as shown in FIG. 2. However, the de-interleaver DIL 210 and the de-interleaved data p-DIL 201 are not present in the SRS decoder as indicated by crosses 310, 310'. Instead, the post FFT data p-FFT 103 is coupled to the input of a modified Zadoff-Chu unit ZC* 320. The output of the unit ZC* is provided on a multiplier interface M-ZC* 303 and processed by a modified unit IDFT* 330 to apply an inverse Discrete Fourier Transform, which provides an output of modified time domain channel taps TimDom* 302. The time domain data on the interface TimDom* is coupled to a signal quality detector 370 for detecting a signal quality from the time domain signals based on a subset of the carrier frequencies. The signal quality detector may comprise the UE-SEP unit 240 for separating the data of a respective UE, coupled to the discrete Fourier Transform unit DFT 250 and the noise estimator SNR-EST 260, which determines the signal to noise ratio for the respective UE based on the group of subcarriers assigned to that UE in the SRS signal so as to output the required signal quality.

Alternatively, the IDFT block may be constructed such that only the relevant time domain samples are outputted in system memory, in which case TimDom* 302 will be the same as TimDom 202 in FIG. 2 and also making UE_SEP* 340 identical to US_SEP 240 in FIG. 2. The modifications are elucidated below, and include that ZC* is modified so that zeros are inserted every other sample. The IDFT* size is doubled to receive the additional samples. The time domain channel taps, e.g., time domain response, is thereby duplicated. The duplicated copy can be eliminated either by outputting to memory only the needed time domain samples, or can be eliminated while further processing the signal in a UE-SEP* unit 340, similar to the UE-Sep unit 240 described above.

Referring to FIG. 3 in more detail, the example of a signal decoder is arranged to decode signal elements in a communication signal which comprises interleaved carrier frequencies. The decoder has an input interface 103 for receiving antenna signals in a frequency domain, e.g. as generated by an FFT unit from the received antenna signals, and a multiplier, for example the ZC* 320, for multiplying the antenna signals by a modified complex-valued mathematical sequence. For example, the original ZC sequence is a predetermined sequence having the property that cyclically shifted versions of the sequence imposed on a signal result in zero correlation with one another to generate multiplied antenna signals on a multiplier interface. The modified sequence ZC* has zeros inserted for frequency components that are not part of the required group, e.g. according to the comb function as elucidated below, and generates specific multiplied antenna signals, depicted as M-ZC* 303. The decoder further has an inverse frequency to time converter for (digitally) converting frequency domain signals to time domain signals, for example the IDFT* 330, coupled to the multiplier interface for converting the specific multiplied antenna signals to time domain signals on a time domain interface. The decoder further has a signal quality detector coupled to the time domain interface for detecting a signal quality from the time domain signals based on a subset of the carrier frequencies, for example the UE-SEP* unit 340, the DFT converter 250 and SNR-EST estimator 260.

In an embodiment of the multiplier ZC* 320, the complex-valued mathematical sequence is provided with interleaved zero values corresponding to carrier frequencies that are not included in the subset. Also, the inverse frequency to time converter has a transform size for receiving the multiplied antenna signals including all carrier frequencies. The proposed decoding obviates the traditional de-interleaving process, by using properties of the Inverse Fourier Transform (usually denoted IFFT or IDFT) as further elucidated below. The de-interleaving is done transparently by adaptation of the transform size and the Zadoff Chu (ZC) reference sequence. For example in the case where the subset is odd or even carrier frequencies in an interleaved scheme, the ZC sequence has inserted zeros every second sample and the transform size is doubled. The proposed decoder lacks separate de-interleaving processing, and associated interfaces, control overhead on DSP core and complex scheduling.

Optionally, in the signal decoder the multiplier is arranged for multiplying the antenna signals by a Zadoff-Chu sequence as the complex-valued mathematical sequence, the Zadoff-Chu sequence being provided with interleaved zero values corresponding to other carrier frequencies that are not included in the subset. The other carrier frequencies may be part of an other combs subset). By adding the zero values effectively any carrier frequencies not part of the subset are removed.

Optionally, the subset has a filter according to a comb having carrier frequencies interleaved with carrier frequencies not being part of the subset, and the multiplier is arranged for multiplying the antenna signals by the complex-valued mathematical sequence that is provided with zero values according to the comb. Such a comb arrangement effectively filters the subset of carrier frequencies from the communication signal. In practice, the subset may comprise odd or even carrier frequencies arranged according to the comb. Also, the inverse frequency to time converter may have a transform size that corresponds to twice the size of the subset. The inverse frequency to time converter may be arranged for selecting the time domain signals by discarding a redundant copy in the time domain and presenting the selected time domain signals on the time domain interface, in which case TimDom* 302 is identical to TimDom 202.

Optionally, the signal quality detector has a selector for selecting a subset of the time domain signals corresponding to the subset of carrier frequencies while discarding further time domain signals on the time domain interface.

Optionally, in the signal decoder the inverse frequency to time converter is arranged for selecting a subset of the time domain signals corresponding to the subset of carrier frequencies while discarding further time domain signals, and providing the subset of the time domain signals as selected on the time domain interface. It may be noted that even if the transform size is increased (e.g. ×2) we can discard half of the output by an output selector, which enables a normal size of the time domain interface (IDFT output interface). The signal quality detector may be arranged for said selecting the time domain signals by discarding a redundant copy in the time domain present on the time domain interface.

Optionally, the signal elements are reference signals to be transmitted by a mobile user device, the subset corresponding to carrier frequencies assigned to a respective user device in the communication system. For example, the reference signals may be sounding reference signals (SRS) in a communication system according to a LTE (Long Term Evolution) system standard, as described in the introductory part.

Optionally, in the signal decoder the inverse frequency to time converter is an inverse digital Fourier transform converter. The inverse digital Fourier converter is well-known as such.

Optionally, in the signal decoder the signal quality detector comprises a time to frequency domain converter arranged for converting the subset of the time domain signals to a frequency spectrum, and a signal to noise estimator coupled to the time to frequency converter for determining a signal to noise ratio for the subset of carrier frequencies. Such a signal to noise estimator is known as such.

Figure 4:
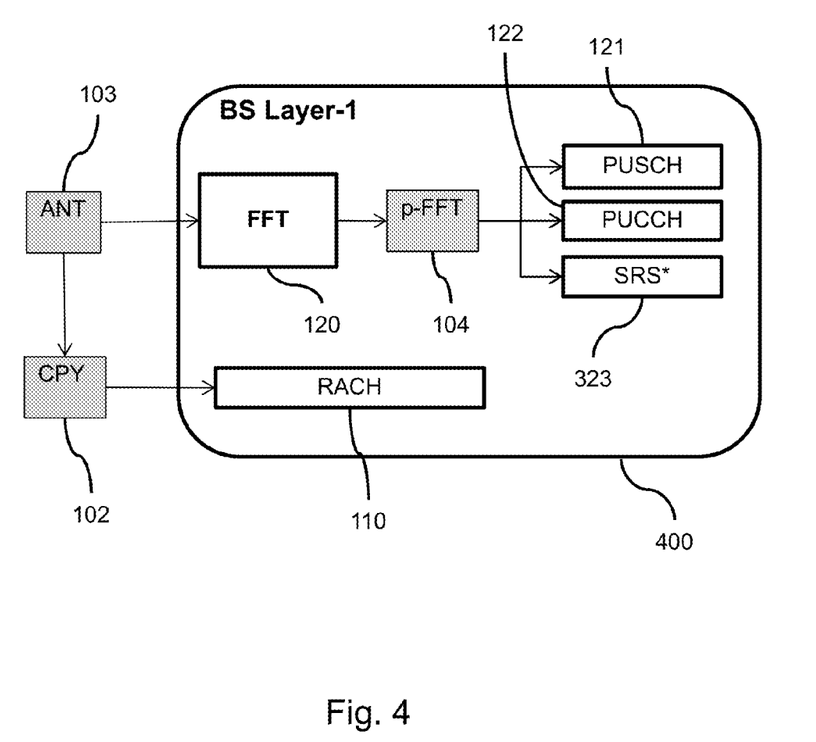
FIG. 4 shows an example of a receiver for a communication signal in a communication system.

FIG. 4 shows an example of a receiver for a communication signal in a communication system. The example receiver is shown in an LTE communication system, like FIG. 1, of which common elements are not described again here. The Figure shows a receiver 400 coupled to an antenna data interface ANT 103. The post FFT data is coupled to the decoder 323 as described above with FIG. 3, for decoding the sounding reference signals (SRS) used to estimate the uplink channel conditions for each user to decide the best uplink scheduling based on decoding reference signals using interleaved carrier frequencies. The Figure shows a receiver for a communication signal in a communication system, the communication signal comprising interleaved carrier frequencies. The receiver comprises the signal decoder 323 as described in any of the examples and options above, and a converter 120 for converting antenna signals 103 from time domain signals to a frequency domain signal 104. The converter is coupled to the input interface of the decoder.

In practice, an integrated circuit may comprise the signal decoder according to any of the above examples, or the receiver as shown in FIG. 4.

Figure 5:
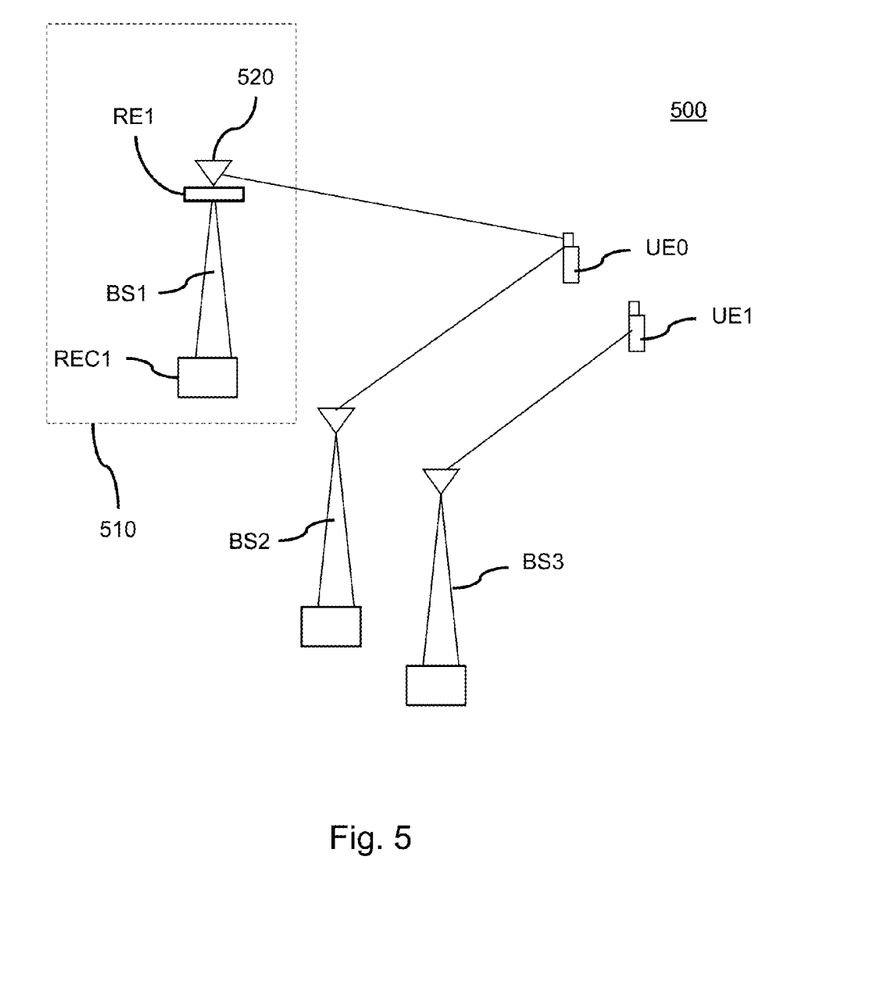
FIG. 5 shows an example of an overview of a mobile communication system, FIG. 6a schematically shows an example of an embodiment of generating an SRS signal in a transmitter, FIG. 6b schematically shows an example of an embodiment of receiving an SRS signal in receiver.

FIG. 5 shows an example of an overview of a mobile communication system. In the example, the mobile communication system 500 has three base stations BS1, BS2, BS3 and two mobile devices, called user equipment UE0, UE1. The first user equipment UE0 is shown to communicate with two base stations BS1 and BS2, e.g., in a communication handover process, and the other user equipment UE1 is shown to communication with BS3. In the first base station 510 a radio unit RE1 is coupled to an antenna 520 for radio transmitting and receiving. The radio unit RE1 is coupled to a radio controller unit REC1 for providing transmission data and control information to the radio unit RE1. The radio equipment unit RE1 and radio equipment controller unit REC 1 in the base station BS1 may be connected via a standardized interface. The receiver as described with reference to FIG. 4 may be implemented in the base station 510, the base station comprising at least one antenna and said receiver, while the receiver is coupled to the antenna. In practice, the receiver may be located in the radio equipment controller unit REC1, while antenna signals are generated in the radio equipment unit RE1.

Figure 6A:
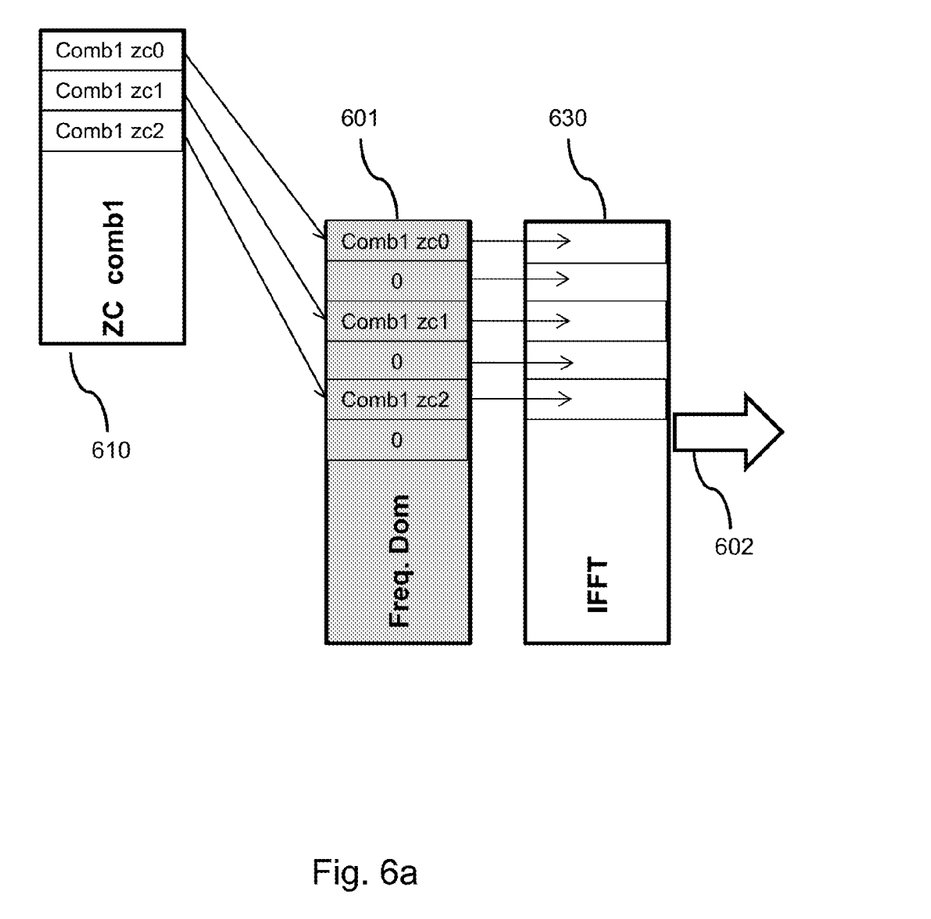
Figure 6B:
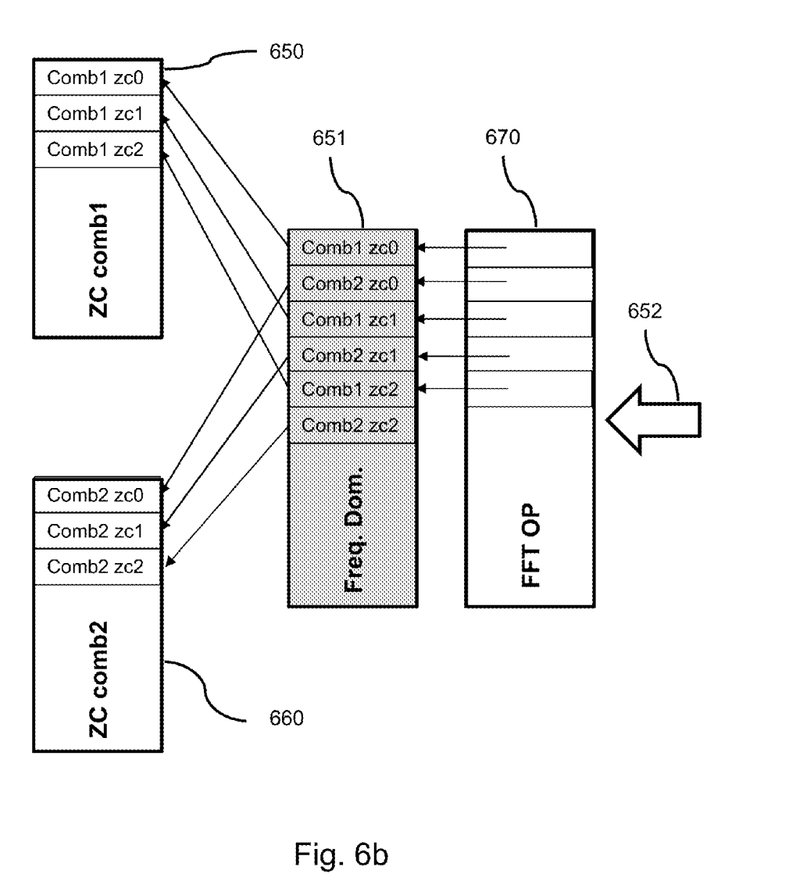

FIG. 6a schematically shows an example of an embodiment of generating an SRS signal in a transmitter. Such a transmitter may be part of a mobile user device, commonly named a user equipment UE as shown in FIG. 5, and is described from the transmitter (UE) perspective. The transmitter has a comb controller 610 for setting the subset of carrier frequencies assigned to the UE. The UE should transmit a communication signal that is processed according to the comb and the Zadoff Chu sequence (ZC 0, 1, 2, 3, . . . ). In the LTE system the UE is allocated either the even or odd index subcarriers in the frequency container grid. The comb controller comprises a Zadoff Chu processor and generates frequency elements in a frequency domain interface 601. Let's assume for this example, that the UE is allocated (some of) the even subcarrier indexes (index 0, 2, 4, . . . ). Subsequently, the UE will have to transmit its communication signal onto the carrier frequencies having indexes 0, 2, 4, . . . . To avoid other carriers, the UE will set zeros for every other subcarrier index (1, 3, 5, . . . ), as shown on the frequency domain interface 601. The transmitter further has an inverse fast Fourier transformer IFFT 630 for generating a transmission signal 602 in the time domain. Hence the UE is performing the IFFT operation to convert the frequency domain signal to time domain signal for transmission over the air FIG. 6*b* schematically shows an example of an embodiment of receiving an SRS signal in receiver. Such a receiver may be part of a base station, as shown in FIG. 5, and is described from the receiver (BS) perspective. A received antenna signal 652 is converted by a converter FFT_OP 670 for performing a fast Fourier operation to generate frequency domain signals on frequency domain interface 651. The receiver has a comb controller 650 for selecting the subset of carrier frequencies assigned to a first UE from the frequency domain interface 651. A further comb controller 660 is shown for selecting the subset of carrier frequencies assigned to a second UE. The first UE should transmit a communication signal that is processed according to the comb and the first Zadoff Chu sequence, as elucidated with FIG. 6*a*.

Traditionally the receiver receives the SRS symbols and separates the FFT output subcarriers into odd and even subcarriers indexes by extraction the using the comb1 and comb2 operation on the set of subcarriers that is first de-interleaved. However, such process requires DSP processing, large memory interfaces and traffic in a digital signal processor (DSP) to transfer the data. As indicated above, the traditional de-interleaving is replaced by an adapted ZC sequence and increased transform size of the IDFT. The mathematical background is explained now. The IDFT operation is adapted for input containing zeros every other sample. The IDFT operation is represented by:

$$x_n = \frac{1}{N}\sum_{k=0}^{N-1} X_k \cdot e^{i2\pi kn/N}$$

Now assume input is inserted zeros every other sample, and N2=2*N.

$$x'_n = \frac{1}{N_2}\sum_{k=0}^{N_2-1} X_k \cdot e^{i2\pi kn/N_2} = \frac{1}{2N}\sum_{k=0}^{2N-1} X_k \cdot e^{i2\pi kn/2N} =$$

$$\frac{1}{2N}\sum_{k'=0}^{N-1} X_{(2k')} \cdot e^{i2\pi(2k')n/2N} + \frac{1}{2N}\sum_{k''=0}^{N-1} X_{(2k''+1)} \cdot e^{i2\pi(2k''+1)n/2N}$$

Subsequently, zero is assumed for the second term as indicated:

$$x'_n = \frac{1}{2N}\sum_{k'=0}^{N-1} X_{(2k')} \cdot e^{i2\pi(2k')n/2N} + \underbrace{\frac{1}{2N}\sum_{k''=0}^{N-1} X_{(2k''+1)} \cdot e^{i2\pi(2k''+1)n/2N}}_{=0} =$$

$$\frac{1}{2N}\sum_{k'=0}^{N-1} X_{(2k')} \cdot e^{i2\pi(2k')n/2N} = \frac{1}{2}\frac{1}{N}\sum_{k_2=0}^{N-1} X_{k_2} \cdot e^{i2\pi k_2 n/N_2} = \frac{1}{2}x_n$$

It appears that the adapted DFT operation is identical, with a scalar ½ factor, for the samples between n=0 & n=N−1, and for the samples between N & 2N−1 (n+N), one finds the previous values, as in the following formula:

$$x'_{N+n} = \frac{1}{N_2}\sum_{k=0}^{N_2-1} X_k \cdot e^{i2\pi k(N+n)/N_2} = \frac{1}{2N}\sum_{k=0}^{2N-1} X_k \cdot e^{i2\pi k(N+n)/2N} =$$

$$\frac{1}{2N}\sum_{k'=0}^{N-1} X_{(2k')} \cdot e^{i2\pi(2k')(N+n)/2N} + \frac{1}{2N}\sum_{k''=0}^{N-1} X_{(2k''+1)} \cdot e^{i2\pi(2k''+1)(N+n)/2N}$$

$$x'_{N+n} = \frac{1}{2N}\sum_{k'=0}^{N-1} X_{(2k')} \cdot e^{i2\pi(2k')(n)/2N} + \underbrace{\frac{1}{2N}\sum_{k'=0}^{N-1} X_{(2k')} \cdot e^{i2\pi(2k')(N)/2N}}_{=0} =$$

$$\frac{1}{2N}\sum_{k'=0}^{N-1} X_{(2k')} \cdot e^{i2\pi(2k')(n)/2N} = x'_n$$

Using the above formula, adapted as proposed by inserting zeroes and increasing the transforming size, for simulation it has been found that in the time domain a copy is generated.

Figure 7:
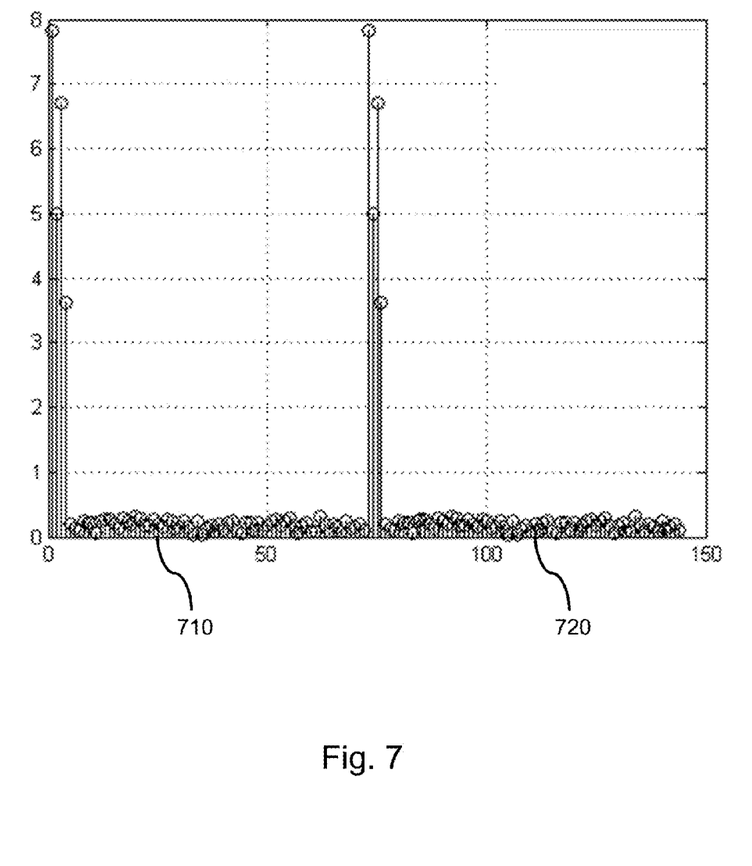
FIG. 7 shows time domain signals as simulated using a modified IDFT operation.

FIG. 7 shows time domain signals as simulated using a modified IDFT operation. The time domain signals are generated based on a simulation using the formulae as described above. On the horizontal axis time domain channel paths are indicated, while on the vertical axis the channel tap amplitude is indicated. Compared to the traditional processing, the required results 710 are found in the first half of the diagram, although with a ½ scalar factor, or with a −1 in the exponent if the data is expressed in fixed point format [mantissa, exponent], which is DSP traditional fixed point format. A subsequent <<copy>> region 720 can be dropped to keep the following processing stages unchanged. In the Figure in the right half, i.e. a range of about 73 to 144 in the horizontal axis time domain channel paths, the same amplitudes are found as in the first half. This part 720 of the time domain signals is to be discarded. Alternatively, the central part (range of 37 to 108) of the time domain signals may be removed, while keeping the initial part (range 0 to 35) and the last part (range 109 to 144).

In practice, the additional copy on the time domain interface can be seen as a penalty to cope with, for example by extending the time domain buffer to hold the total IDFT result. Subsequently, the separator unit may select the respective values from the buffer. Alternatively, in the IDFT processor, a removal unit may be added to remove the redundant values before outputting the time domain values on the time domain interface, so outputting only the number of samples required for traditional time domain processing to keep the following processing stages unchanged.

Figure 8:
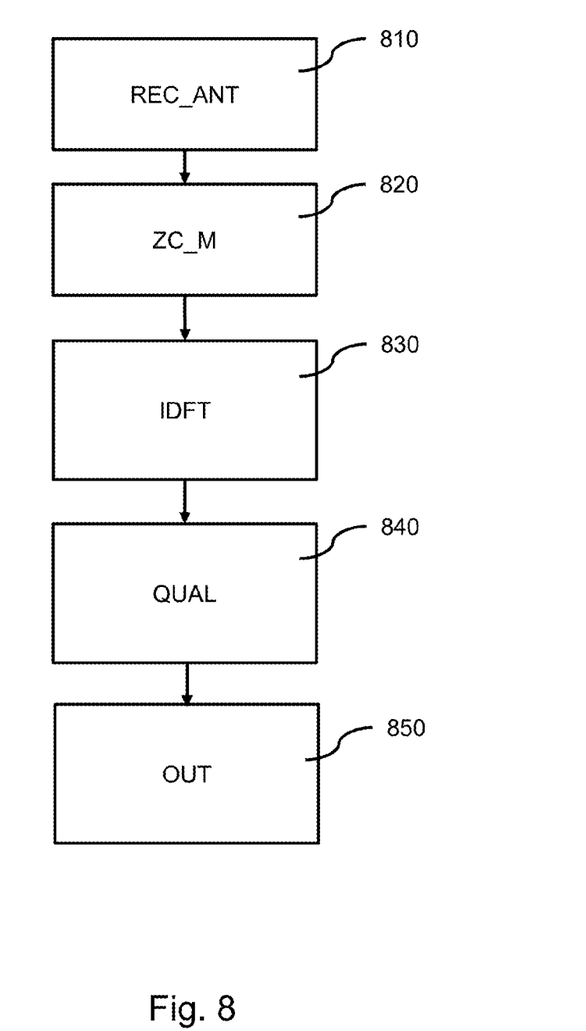
FIG. 8 shows an example of a method of decoding signal elements in a communication signal in a communication system.

FIG. 8 shows an example of a method of decoding signal elements in a communication signal in a communication system. The communication signal has interleaved carrier frequencies. The method of the decoding start at node REC_ANT 810 by receiving antenna signals in a frequency domain. Then, at node ZC_M 820, the frequency domain antenna signals are multiplied by a complex-valued mathematical sequence, for example the Zadoff Chu sequence as elucidated above, to generate multiplied antenna signals. The complex-valued mathematical sequence is provided with zero values corresponding to carrier frequencies that are not included in a subset of carrier frequencies for which the quality is to be determined. Then, at node IDFT 830, these ZC multiplied antenna signals are inverse frequency to time converted from frequency domain signals to time domain signals. The inverse frequency to time converting has a transform size for receiving the multiplied antenna signals including all carrier frequencies. The method may include selecting a subset of the time domain signals corresponding to the subset of carrier frequencies while discarding further time domain signals. Then, at node QUAL 840, signal quality is detected from the time domain signals based on the subset of the carrier frequencies. The method, at stage QUAL 840, may include a process UE_SEP for separating the subset of carrier frequencies for a respective user equipment, and a DFT process for time to frequency converting the subset of the time domain signals to a frequency spectrum, and an SNR_EST process for signal to noise estimating by determining a signal to noise ratio for the subset of carrier frequencies from the frequency spectrum.

Figure 9:
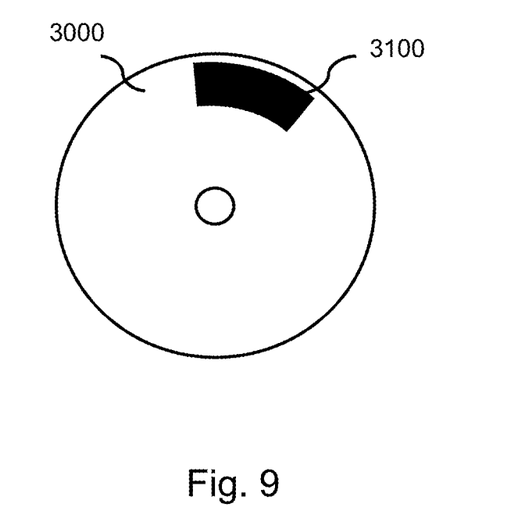
FIG. 9 shows a computer readable medium comprising a computer program product.

FIG. 9 shows a computer readable medium 3000 comprising a computer program product 3100, the computer program product 3100 comprising instructions for causing a processor apparatus to perform a method of decoding signal elements in a communication signal in a communication system. The method is described above with reference to FIG. 8. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 9 as an optical disc, the computer readable medium 3000 may be any suitable computer readable medium, such as a hard disk, solid state memory, flash memory, etc., and may be non-recordable or recordable.

The invention may also be implemented in a computer program for running on a processor, e.g. a digital signal processor, at least including code portions for performing steps of a method according to the invention when run on the programmable device. The computer program may for instance include one or more of: a subroutine, a function, a procedure, an object method, an object implementation, an executable application, a source code, an object code, a shared library/dynamic load library and/or other sequence of instructions designed for execution on a computer system. The computer program may be provided on a data carrier, such as a CD-ROM or diskette, stored with data loadable in a memory of a data processing system, the data representing the computer program, or other tangible, non-transitory data carrier.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors constituting a bus or interface. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

Furthermore, the description of the decoder and receiver has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements may be circuitry located on a single integrated circuit or within a same device. Alternatively, the receiver may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A signal decoder for decoding signal elements in a communication signal in a communication system, the communication signal comprising interleaved carrier frequencies, the decoder comprising
   an input interface for receiving antenna signals in a frequency domain,
   a multiplier for multiplying the antenna signals by a complex-valued mathematical sequence, cyclically shifted versions of the sequence imposed on a signal resulting in zero correlation with one another to generate multiplied antenna signals on a multiplier interface,
   an inverse frequency to time converter coupled to the multiplier interface for converting the multiplied antenna signals from frequency domain signals to time domain signals on a time domain interface,
   a signal quality detector coupled to the time domain interface for detecting a signal quality from the time domain signals based on a subset of the carrier frequencies, wherein
   the complex-valued mathematical sequence is a Zadoff-Chu sequence, the Zadoff-Chu sequence provided with zero values corresponding to carrier frequencies that are not included in the subset,
   the subset is arranged according to a comb function having carrier frequencies interleaved with carrier frequencies not being part of the subset, and the multiplier is configured to multiply the antenna signals by the complex-valued mathematical sequence, wherein the complex-valued mathematical sequence is provided with zero values according to the comb function, and
   the inverse frequency to time converter has a transform size corresponding to the multiplied antenna signals including all carrier frequencies.

2. The signal decoder as claimed in claim 1, wherein the subset comprises odd or even carrier frequencies arranged according to the comb function.

3. The signal decoder as claimed in claim 2, wherein the inverse frequency to time converter has a transform size that corresponds to twice a size of the subset.

4. The signal decoder as claimed in claim 1, wherein the signal quality detector is arranged for selecting a subset of the time domain signals corresponding to the subset of carrier frequencies while discarding further time domain signals on the time domain interface.

5. The signal decoder as claimed in claim 4, wherein the signal quality detector is arranged for said selecting the time domain signals by discarding a redundant copy in the time domain present on the time domain interface.

6. The signal decoder as claimed in claim 1, wherein the inverse frequency to time converter is arranged for selecting a subset of the time domain signals corresponding to the subset of carrier frequencies while discarding further time domain signals, and providing the subset of the time domain signals as selected on the time domain interface.

7. The signal decoder as claimed in claim 1, wherein the signal elements are reference signals to be transmitted by a mobile user device, the subset corresponding to carrier frequencies assigned to a respective user device in the communication system.

8. The signal decoder as claimed in claim 7, wherein the reference signals are sounding reference signals, SRS, in a communication system according to a LTE, Long Term Evolution, system standard.

9. The signal decoder as claimed in claim 1, wherein the inverse frequency to time converter is an inverse digital Fourier transform converter.

10. The signal decoder as claimed in claim 1, wherein the signal quality detector comprises
    a time to frequency converter arranged for converting the subset of the time domain signals to a frequency spectrum, and
    a signal to noise estimator coupled to the time to frequency converter for determining a signal to noise ratio for the subset of carrier frequencies.

11. A receiver for a communication signal in a communication system, the communication signal comprising interleaved carrier frequencies, the receiver comprising
    the signal decoder according to claim 1, and
    a converter for converting antenna signals from time domain signals to a frequency domain signals, wherein the converter is coupled to the input interface of the decoder.

12. An integrated circuit comprising the signal decoder according to claim 1.

13. A base station in a communication system, the base station comprising at least one antenna and the receiver according to claim 11, wherein the receiver is coupled to the antenna.

14. A method of decoding signal elements in a communication signal in a communication system, the communication signal comprising interleaved carrier frequencies, the decoding comprising
    receiving antenna signals in a frequency domain,
    multiplying the antenna signals by a complex-valued mathematical sequence, cyclically shifted versions of the sequence imposed on a signal resulting in zero correlation with one another to generate multiplied antenna signals on a multiplier interface,
    inverse frequency to time converting the multiplied antenna signals from frequency domain signals to time domain signals on a time domain interface,
    signal quality detecting a signal quality from the time domain signals based on a subset of the carrier frequencies, wherein
    the complex-valued mathematical sequence is provided with zero values corresponding to carrier frequencies that are not included in the subset, the subset arranged according to a comb function having carrier frequencies interleaved with carrier frequencies not being part of the subset,
    the complex-valued mathematical sequence is provided with zero values according to the comb function, and the inverse frequency to time converting has a transform size corresponding to the multiplied antenna signals including all carrier frequencies.

15. The method as claimed in claim 14, the method comprising selecting a subset of the time domain signals corresponding to the subset of carrier frequencies while discarding further time domain signals.

16. The method as claimed in claim 14, the method comprising
   time to frequency converting the subset of the time domain signals to a frequency spectrum, and
   signal to noise estimating by determining a signal to noise ratio for the subset of carrier frequencies.

17. A non-transitory computer readable storage medium comprising instructions for causing a processor system to perform a method according to claim 14.

* * * * *